US005473238A

United States Patent [19]
Latham, II et al.

[11] Patent Number: 5,473,238
[45] Date of Patent: Dec. 5, 1995

[54] DISC DRIVE POWER MANAGEMENT SYSTEM

[75] Inventors: Paul W. Latham, II, Lee; Peter K. Scheller, Rochester, both of N.H.

[73] Assignee: Allegro Microsystems, Inc., Worcester, Mass.

[21] Appl. No.: 138,315

[22] Filed: Oct. 18, 1993

[51] Int. Cl.$^6$ .................................. H02P 5/40; H02P 6/02
[52] U.S. Cl. .......................... 318/560; 318/561; 318/254; 318/138; 318/40; 360/53; 360/77.08
[58] Field of Search ....................................... 318/138, 254, 318/439, 560–646, 681, 34–79; 360/72–79

[56] References Cited

U.S. PATENT DOCUMENTS

| | | | |
|---|---|---|---|
| 4,417,164 | 6/1981 | Edlund | 307/497 |
| 4,639,798 | 1/1987 | Harrison et al. | 360/73 |
| 4,658,308 | 4/1987 | Sander | 360/74.1 |
| 4,679,102 | 7/1987 | Wevers et al. | 360/75 |
| 4,933,785 | 6/1990 | Morehouse et al. | 360/78.04 |
| 5,050,016 | 9/1991 | Squires | 360/77.08 |
| 5,062,023 | 10/1991 | Squire | 360/78.04 |
| 5,095,254 | 3/1992 | Ueki | 318/138 |
| 5,121,262 | 6/1992 | Squires et al. | 360/46 |
| 5,128,568 | 7/1992 | Carpenter | 307/590 |
| 5,204,593 | 4/1993 | Ueki | 318/254 |
| 5,218,253 | 6/1993 | Morehouse et al. | 318/293 |
| 5,258,695 | 11/1993 | Utenick et al. | 318/138 |

*Primary Examiner*—Paul Ip

[57] ABSTRACT

A disc drive circuit includes a pair of DC busses across which are directly connected a disc actuator power amplifier and a three phase spindle motor power amplifier which may be comprised of three circuit branches, each branch having two NMOS transistors connected in series with the junction therebetween connected to one of three spindle motor terminals. A transistor switch is connected between a DC supply source and the DC busses for disconnecting the busses from the voltage source only when the supply voltage drops below a nominal operating voltage range. In one embodiment a full wave diode rectifier is also directly connected across the pair of busses and further connected to the three motor terminals, whereby when the switch is open the back e.m.f. of the free spinning spindle motor energizes the actuator amplifier enabling parking of the actuator heads. In another embodiment the drain to channel regions of the six NMOS transistors are adapted to assume the role of a full wave rectifier. In a third embodiment, added circuitry transforms the NMOS transistors into six simulated diodes to serve as a very efficient full wave rectifier only when the switch opens.

7 Claims, 4 Drawing Sheets

DISC DRIVE POWER MANAGEMENT SYSTEM

BACKGROUND

This invention relates to computer disc drives and more particularly to a power management system for disc drivers of spin and actuator motors during power failure.

To provide for data integrity, most disc drives park their read/write heads on a special landing zone when spinning up or down. To park the heads without external power during a power fault condition, the inertia of the spindle motor is used to provide power to the actuator for parking the heads. Such a retract power regeneration system is as follows.

The inertia of the spindle is converted to electrical power by rectifying the back electromotive force (e.m.f.) of the spindle motor. In typical disc drive designs, represented in the circuit of FIG. 1, the spindle motor 10 is a three phase brushless DC motor. The full wave rectifier 12 has six diodes 14, 16, 18, 20, 22 and 24.

In normal operation, Vcc is high and diodes 26 and 28 are conducting, and these two diodes provide for power to the spindle power amplifier 30 and the actuator power amplifier 32.

When power is lost while the spindle is running, diodes 26 and 28 are non-conducting; diode 26 blocking power supply voltage Vcc from the spindle power amplifier 30 and diode 28 blocking Vcc from the actuator power amplifier 10. The back e.m.f. of the spindle motor meanwhile provides voltage to the actuator 33 for parking.

Thus during power loss, diodes 26 and 28 are required to keep from diverting energy from the spinning spindle motor into the other circuits 34, all of which energy is needed for energizing the actuator power amplifier 32.

The DC voltage available for energizing each the spindle and actuator driver amplifiers 30 and 32 is less than Vcc by one diode voltage drop, i.e. at least a 0.6 volt drop in a silicon integrated circuit. This diode voltage loss imposes a major design constraint for the spindle motor 10 and the driver amplifiers 30 and 32.

It is an object of this invention to provide a disc drive power management system that over comes the above noted short comings of prior art disc drives.

It is a further object of this invention to provide a disc drive power management system that circumvents the need for blocking diodes interposed between the DC power supply and the power amplifiers for driving the spindle and actuator motors.

SUMMARY OF THE INVENTION

A disc drive power management system includes a pair of DC-voltage busses, three spindle-motor terminals to which a three phase DC spindle motor may be connected, and two actuator-motor terminals to which an actuator motor may be connected. A three phase spindle-motor power amplifier is connected directly between said pair of DC-voltage busses, and to said three spindle-motor terminals. An actuator-motor power amplifier is connected directly between said DC-voltage busses and to said actuator-motor terminals. There are also two DC-supply-voltage terminals to which a DC voltage source may be connected and a transistor switch means. The pair of DC-voltage busses is connected to said DC-supply-voltage terminals through said transistor switch means for turning on and energizing said busses when the voltage appearing across said two DC-supply-voltage terminals is within a predetermined nominal range, and is for turning off and de-energizing said busses when the voltage appearing across said two DC-supply-voltage terminals falls below said range.

In one embodiment of the invention, there is additionally included a three phase full wave rectifier means connected directly between said pair of DC-voltage busses, and is additionally connected to said three spindle-motor terminals for when said transistor switch means de-energizes said DC voltage busses, applying the back e.m.f. that may be generated by a free spinning spindle motor connected to said spindle motor terminals, to said actuator power amplifier via said busses.

In a second embodiment, the spindle-motor power amplifier is a three phase amplifier including three pairs of field effect driver transistors. Each pair of driver transistors is connected in a series branch circuit which is connected directly across said pair of DC voltage busses. The junction between said pair of transistors in each series branch circuit is connected respectively to one of said three spindle motor terminals. The orientation of said six driver transistors is the polarity which renders conducting the PN-junction diode formed by the drain and channel region of each of the field effect driver transistors during a period when said busses have become de-energized by said switch means turning off and simultaneously a free spinning spindle motor that may have been connected to said three spindle-motor terminals generates a back e.m.f. voltage across said three spindle-motor terminals. During such periods when the DC busses are de-energized, said orientation of said PN-junction diodes of said six driver transistors are polarized in the direction for energizing said actuator power amplifier from said e.m.f of the free-spinning spindle motor. In this way, during de-energization of said busses by said switch means, said field effect transistors serve as a full wave rectifier of said back e.m.f. voltage to said actuator power amplifier.

A third embodiment is an elaboration of the second embodiment, in which there have been added six operational amplifiers each comprising one and another differential inputs, and a single ended output, each of said operational amplifiers associated respectively with one of said six field effect driver transistors. Each of the driver transistors having a source, a drain, and a gate connected to said switch means. One of said source and drain is connected to the channel region and to said one input of said operational amplifier. The other of said source and drain is connected to said other input of said operational amplifier.

The switch means is additionally for during a period when said busses are energized, connecting said driver transistor gates to the outputs of a conventional three phase commutator circuit that may be connected to said switch means, and for during a period when said busses are energized connecting each said driver transistor gate to said associated operational amplifier output, to convert each of said six field effect driver transistors to a simulated FET diode during periods when said busses are de-energized. These simulated diodes form the necessary full wave three phase rectifier for energizing the actuator motor from the energy via the back e.m.f. of the spinning spindle motor when the DC busses are de-energized.

BRIEF DESCRIPTION OF THE DRAWINGS

FIG. 2 shows in a disc drive of this invention, an

DESCRIPTION OF THE PREFERRED EMBODIMENT

Figure 1:
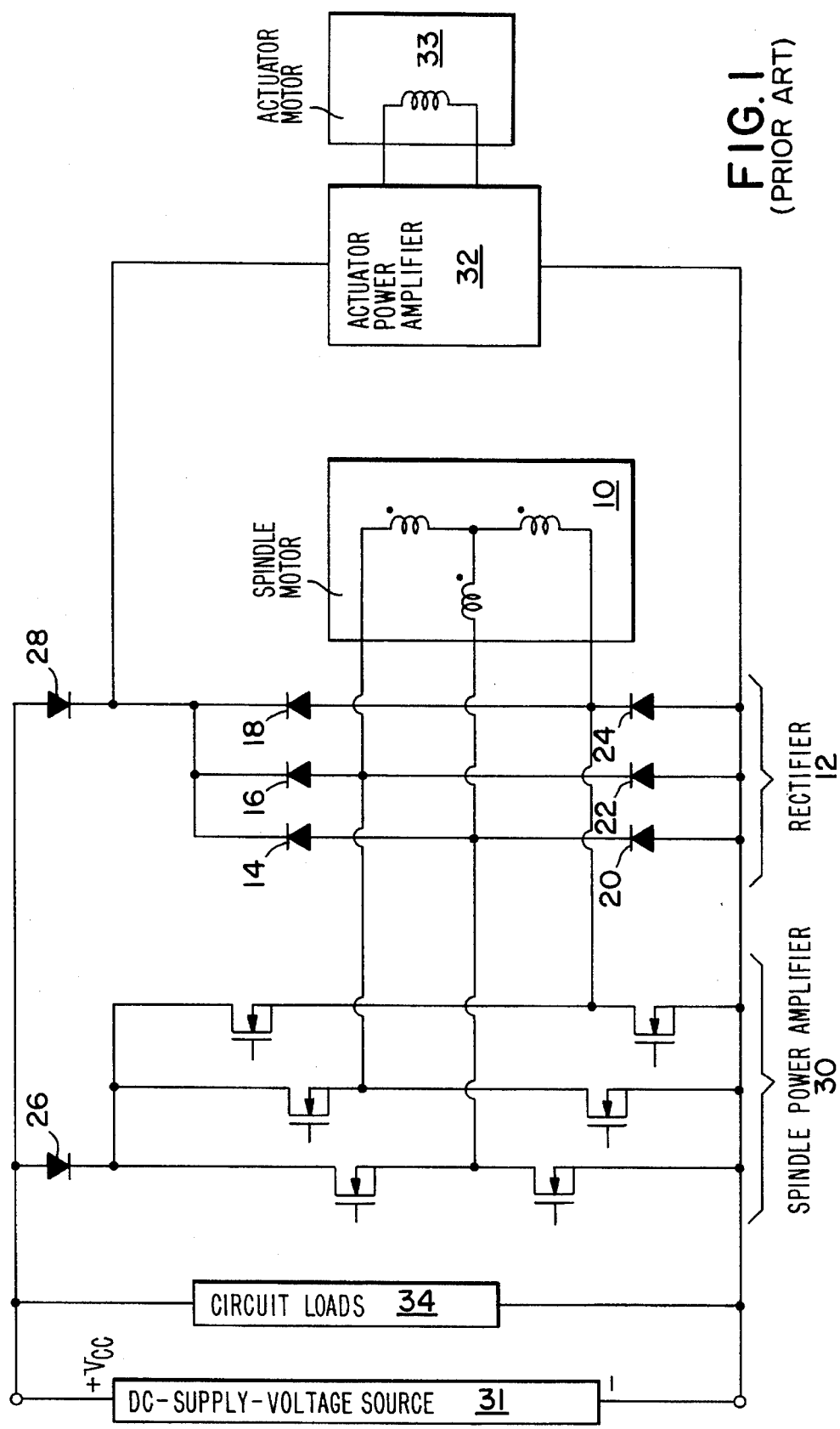
FIG. 1 shows in a disc drive of the prior art, a retract power-regeneration system.
Figure 2:
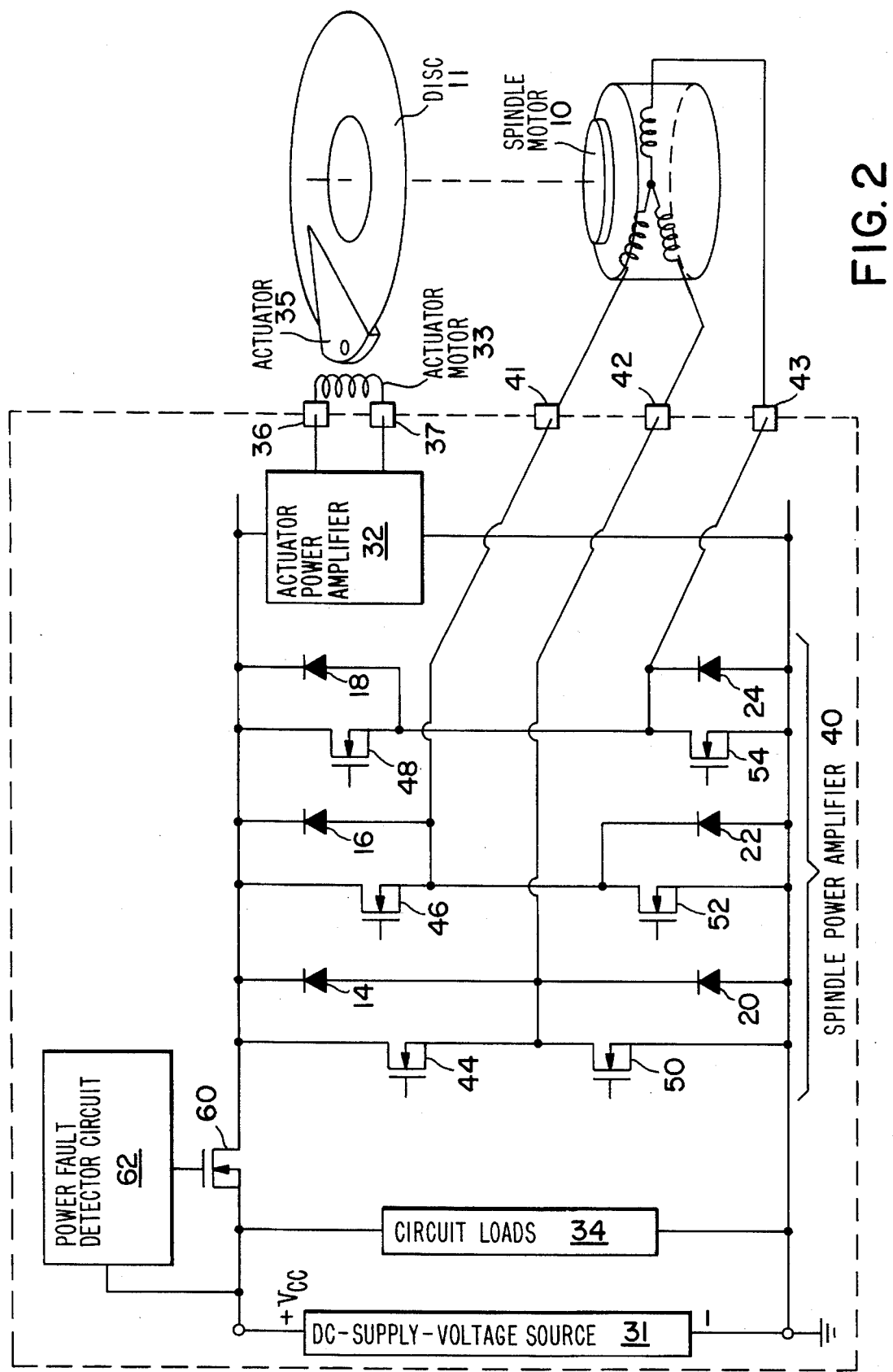

The circuit of FIG. 2 employs the spindle motor 10, the rectifier 12, the actuator power amplifier 32 and the actuator motor 33 of the circuit shown in FIG. 1. However in FIG. 2, the rectifier 12, comprised of the six rectifier diodes 14 through 24, is merged into the spindle power amplifier 40 (owing to the absence in the circuit of FIG. 2 of the blocking diodes 26 and 28 of FIG. 1). Thus in the circuit of FIG. 2, each of the rectifier diodes 14, 16, 18, 20, 22 and 24 are respectively connected directly across each of the spindle-power-amplifier transistors 44, 46, 48, 50, 52 and 54. The three conductor output of spindle power amplifier 40 is connected via the three integrated-circuit contact pads 41, 42 and 43 to spindle motor 10. The two conductor output of the actuator power amplifier 32 is connected via two integrated-circuit contact pads 36 and 37 to actuator motor 33.

A transistor switch 60 of the FET type is interposed between the source 31 of DC supply voltage Vcc and the two power amplifiers 40 and 32. A power fault detector circuit 62 has an output connected to the gate of the transistor switch 60.

When the positive supply voltage Vcc is within a normal range, transistor switch 60 is held in the conducting or on state; and when Vcc drops below a predetermined abnormally low value, e.g. 3 volts, the power fault detector circuit 60 turns off the transistor switch 60 whereby the Vcc supply source 31 is disconnected from the spindle power amplifier 40 and the actuator power amplifier 32.

If at the time the transistor switch 60 turns off the spindle motor 10 and disc 11 are spinning, a back e.m.f. is generated at the contact pads 64, 65 and 66 causing the rectifier six diodes 14 through 24 to be forward biased effecting application of the full wave rectified e.m.f. voltages to actuator power amplifier 30 and via the actuator motor 33 enabling parking of the actuator 35.

Figure 3:
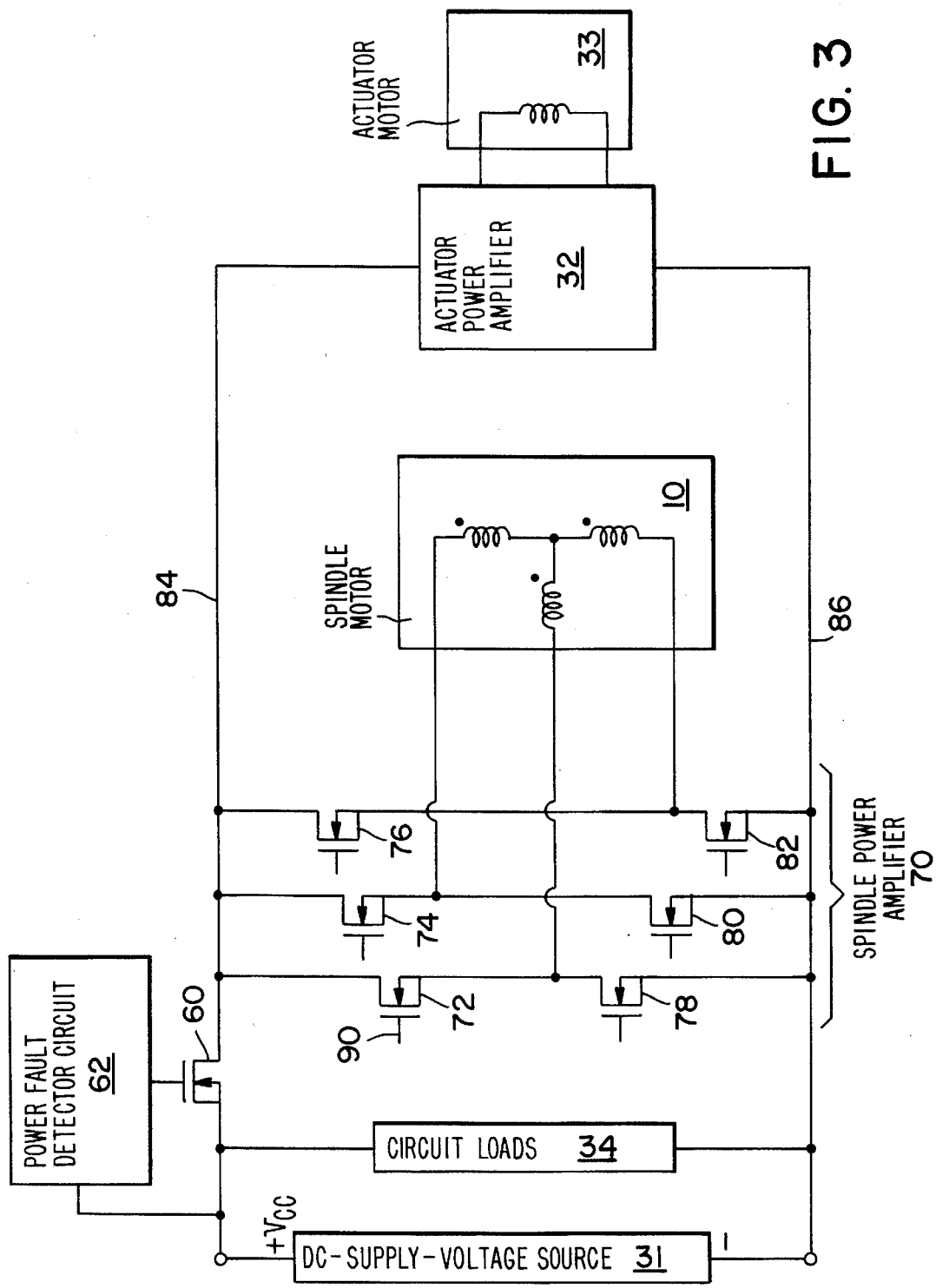
FIG. 3 shows in a disc drive of this invention, another improved retract power-regeneration system.

The circuit of FIG. 3 has no discrete rectifier diodes. Instead, the spindle power amplifier 70 is composed only of six NMOS transistors 72, 74, 76, 78, 80 and 82. When the transistor 60 turns off, the voltage across the DC supply busses 84 and 86 goes to zero and the PN junction between drain and channel region in each NMOS transistor, being polarized so as to be conducting when impressed by the back e.m.f. of the spinning spindle motor 10 to generate a voltage of the polarity that powers the actuator amplifier 32. The rectified voltage across busses 84 and 86 is then applied only to the actuator power amplifier 32 for parking the actuator heads. In this mode of operation, the driver transistors 72 through 82 should be turned off by application of a suitable voltage to each driver transistor gate; this may be done in response to a signal from the output of the power fault detector circuit 62 via switches (not shown) in the gate circuits of the driver transistors 72 through 82, or by turning off the conventional commutator by which the spindle power amplifier is normally driven at the instant of power failure.

The circuit of FIG. 3 may alternatively perform the same retract-power regeneration function in another manner. Instead of turning off the six driver transistors 72 through 82, they may be turned on in a sequence corresponding in time to the alternating polarities of the back e.m.f. voltage appearing at each of the three conductors by which the free spinning spindle motor 10 is connected to the spindle driver amplifier 70. It is common practice to employ in a disc drive system, a rotor position sensor (not shown) within the spindle motor. The gates of the driver transistors 72 through 82 may easily be commutated to turn on in the proper sequences for operation as rectifiers during periods of power failure.

Figure 4:
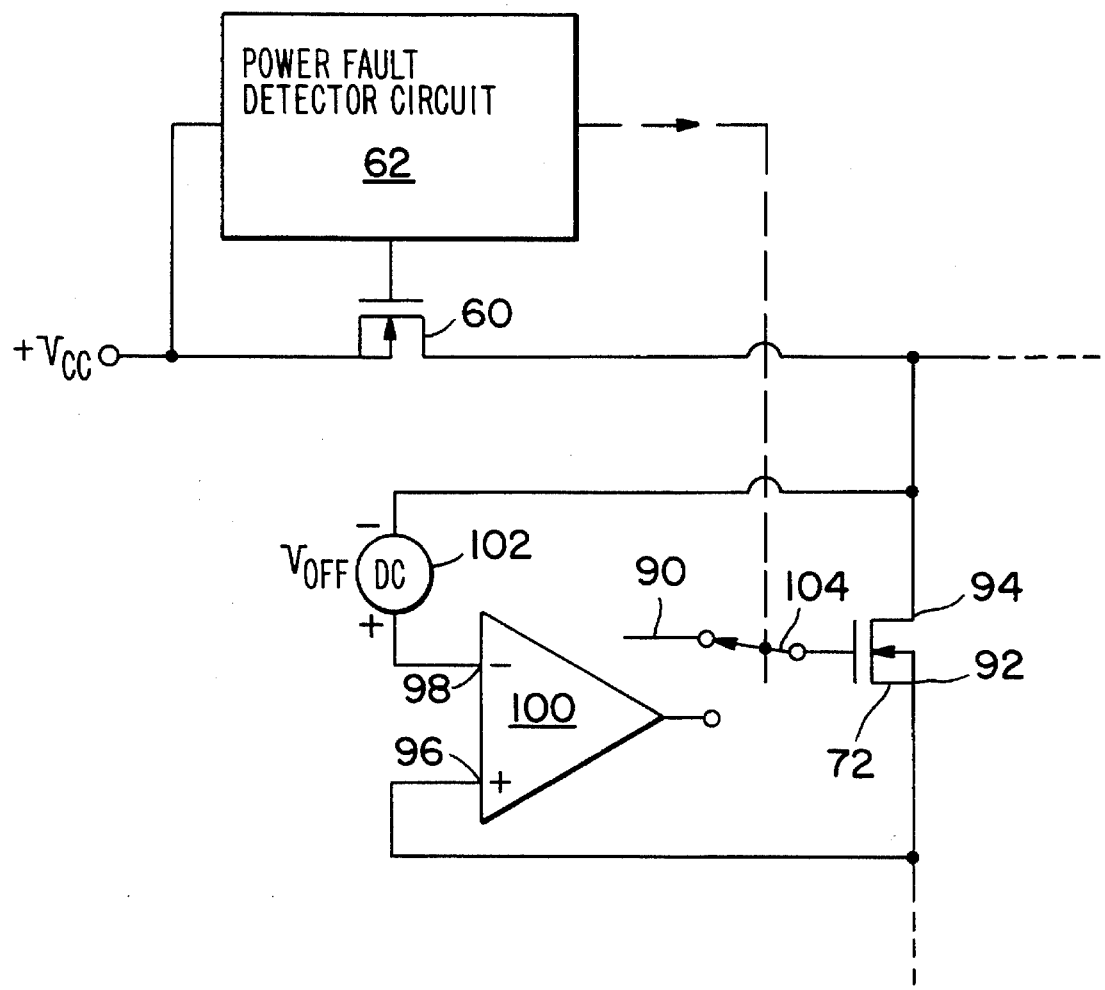
FIG. 4 shows a detail of a further improved retract power-regeneration system, entailing a modification of the system of FIG. 3.

A preferred method for doing this is illustrated in FIG. 4 wherein only spindle driver transistor 72, having an exemplary gate conductor 90 that typically leads to one of the six outputs of a conventional driver commutator (not shown).

Referring to FIG. 4, the NMOS transistor 72 has a source 92 and a drain 94 connected respectively to the plus and minus inputs 96 and 98 of the differential amplifier 100. The amplifier 100 represents an ideal amplifier having zero offset voltage, i.e. has zero output voltage when zero voltage exists between the amplifier inputs 96 and 98. The connection between the drain 94 and the amplifier input 98 is effected via a bias voltage source 102 that is polarized in the direction for biasing transistor 72 in the off state.

During normal operation of the disc drive circuit, the switch 104 is in the position shown in FIG. 4 connecting the gate of transistor 72 to the driver-commutator conductor 90. When a power failure occurs, the power fault detector 62 turns off transistor 60 and also changes the position of switch 104 that connects the gate of transistor 72 to the output of amplifier 100. Now the combination of transistor 72, amplifier 100 and bias voltage source 102 performs as a simulated diode having a cathode and an anode corresponding respectively to the transistor drain 94 and the source 92. The other five driver transistors 74 through 82 would also each have appended such a simulated diode circuit as shown in FIG. 4. Simulated diodes of this kind may have a low forward drop, e.g. from 10 to 100 milli volts, and very low on-resistance compared to PN-junction diodes occupying the same silicon chip area.

Such simulated diode circuits are more completely described in the patent application Ser. No. 08/138,319 to Paul Latham, entitled FET SIMULATED DIODE CIRCUIT, filed simultaneously herewith, and that co-filed application is incorporated by reference herein.

We claim:

1. A disc drive power management system comprising:
  a) a pair of DC-voltage busses;
  b) three spindle-motor terminals to which a three phase DC spindle motor may be connected, and two actuator-motor terminals to which an actuator motor may be connected;
  d) a three phase spindle-motor power amplifier connected directly between said pair of DC-voltage busses, and having an output connected to said three spindle-motor terminals;
  e) an actuator-motor power amplifier connected directly between said DC-voltage busses and having an output connected to said actuator-motor terminals;
  f) two DC-supply-voltage terminals to which a DC voltage source may be connected
  g) a transistor switch means, said pair of DC-voltage busses being connected to said DC-supply-voltage terminals through said transistor switch means for turning on and energizing said busses when the voltage appearing across said two DC-supply-voltage terminals is within a predetermined nominal range, and for turning off and de-energizing said busses when the voltage appearing across said two DC-supply-voltage terminals falls below said range.

2. The disc drive power management system of claim 1 additionally comprising a three phase full wave rectifier means connected directly between said pair of DC-voltage busses, and said rectifier means being additionally connected to said three spindle-motor terminals, for when said transistor switch means de-energizes said DC voltage busses, applying the back e.m.f. voltage that may be generated by a free spinning spindle motor connected to said spindle motor terminals, to said actuator power amplifier via said busses.

3. The disc drive power management system of claim 1 wherein said three phase spindle motor power amplifier comprises three pairs of field effect driver transistors, each said pair of driver transistors being connected in a series branch circuit that is connected directly across said pair of DC voltage busses, the junction between said pair of transistors in each series branch circuit connected respectively to one of said three spindle motor terminals, the orientation of said six driver transistors being that which renders conducting the PN-junction diode formed by the drain and channel region of each said field effect driver transistor when said busses become de-energized by said switch means turning off and when simultaneously a free spinning spindle motor that may have been connected to said three spindle-motor terminals generates a back e.m.f. voltage across said three spindle-motor terminals, said orientation of said PN-junction diodes of said six driver transistors being in the direction for energizing said actuator power amplifier from said e.m.f of the free-spinning spindle motor;

so that during de-energization of said busses by said switch means said field effect transistors serve as a full wave rectifier of said back e.m.f. voltage to energize said actuator power amplifier.

4. The disc drive power management system of claim 1 wherein said three phase DC spindle motor power amplifier includes three pairs of field effect driver transistors and has a three phase output connected to said three spindle-motor terminals, said management system additionally comprising;

a) at least two operational amplifiers each comprising one and another differential inputs, and a single ended output, each of said two operational amplifiers associated respectively with the two field effect transistors of one of said pairs of driver transistors, each of said two driver transistors having a source and a drain and having a gate connected to said switch means, one of said source and drain being connected to the channel region and to said one input of said associated operational amplifier, the other of said source and drain connected to said other input of said associated operational amplifier, said switch means being additionally:

for during a normal running period when said busses are energized, connecting said two driver transistor gates to the outputs of a conventional three phase commutator circuit that may be connected to said switch means, and for during a period when said busses are not energized connecting each said driver transistor gates to said associated operational amplifier output, to convert each of said two field effect driver transistors to a simulated FET diode during periods when said busses are de-energized.

5. A semiconductor integrated circuit disc drive power management system comprising:

a) three spindle-motor contact pads to which a three phase DC spindle motor may be connected, and two actuator-motor contact pads to which an actuator motor may be connected;

b) a pair of DC-voltage busses;

c) three pairs of spindle-motor drive transistors, each of said pair transistors being connected in a series circuit that is connected directly across said pair of DC-voltage busses, the junction between said pair of spindle-motor drive transistors connected respectively to said three spindle-motor contact pads;

d) six rectifier diodes each connected, respectively, directly across one of the six spindle-motor drive transistors in the same polarity with respect to said pair of DC-voltage busses;

e) an actuator power amplifier connected directly between said DC-voltage busses, and having two output conductors connected to said two actuator-motor contact pads; and f) two DC-supply-voltage terminals adapted for connection to a source of DC voltage, and a connection between said DC-supply-voltage terminals and said pair of DC-voltage busses; and g) said DC-supply-voltage terminals-to-busses connection comprises of a transistor switch means for rendering said connection conducting when the voltage appearing across said two DC-supply-voltage terminals is within a predetermined nominal range, and for rendering said connection non-conducting when the voltage appearing across said two DC-supply-voltage terminals falls below said range.

6. A disc drive power management system comprising:

a) a pair of DC-voltage busses;

b) three spindle-motor terminals to which a three phase DC spindle motor may be connected, and two actuator-motor terminals to which an actuator motor may be connected;

d) a three phase spindle-motor power amplifier connected directly between said pair of DC-voltage busses, said-spindle motor power amplifier comprising three pairs of field effect driver transistors and having a three phase output connected to said three spindle-motor terminals;

e) an actuator-motor power amplifier connected directly between said DC-voltage busses and having an output connected to said actuator-motor terminals;

f) two DC-supply-voltage terminals to which a DC voltage source may be connected;

g) a transistor switch means, said pair of DC-voltage busses being connected to said DC-supply-voltage terminals through said transistor switch means, said transistor switch means being for turning on and energizing said busses when the voltage appearing across said two DC-supply-voltage terminals is within a predetermined nominal range, and for turning off and de-energizing said busses when the voltage appearing across said two DC-supply-voltage terminals falls below said range; and h) six operational amplifiers each comprising one and another differential inputs, and a single ended output, each of said operational amplifiers associated respectively with one of said six field effect driver transistors, each of said driver transistors having a source and a drain, and having a gate connected to said switch means, one of said source and drain being connected to the channel region and to said one input of said associated operational amplifier, the other of said source and drain connected to said other input of said associated operational amplifier, said switch means being additionally for during a period when said busses are energized, connecting said driver transistor gates to the outputs of a conventional three phase commutator circuit that may be connected to said switch means, and for during a period when said busses are not energized connecting each said driver transistor gate to said associated operational amplifier output to convert each of said six field effect driver transistors to a simulated FET diode during periods when said busses are de-energized.

7. A disc drive power management system comprising:
a) a pair of DC-voltage busses;
b) three spindle-motor terminals to which a three phase DC spindle motor may be connected, and two actuator-motor terminals to which an actuator motor may be connected;
d) a three phase spindle-motor power amplifier connected directly between said pair of DC-voltage busses, said-spindle motor power amplifier comprising three pairs of field effect driver transistors and having a three phase output connected to said three spindle-motor terminals;
e) an actuator-motor power amplifier connected directly between said DC-voltage busses and having an output connected to said actuator-motor terminals;
f) two DC-supply-voltage terminals to which a DC voltage source may be connected;
g) a transistor switch means, said pair of DC-voltage busses being connected to said DC-supply-voltage terminals through said transistor switch means, said transistor switch means being for turning on and energizing said busses when the voltage appearing across said two DC-supply-voltage terminals is within a predetermined nominal range, and for turning off and de-energizing said busses when the voltage appearing across said two DC-supply-voltage terminals falls below said rage;
h) at least two operational amplifiers each comprising a first and a second differential inputs, and a single ended output, said two operational amplifiers associated respectively with the two driver transistors making up one of said driver transistor pairs, each of said one-pair driver transistors having a source and a drain, and having a gate connected to said switch means, one of said source and drain being connected to the channel region and to said one input of said associated operational amplifier, the other of said source and drain connected to said other input of said associated operational amplifier, said switch means being additionally for during a period when said busses are energized, connecting said driver transistor gates to the outputs of a conventional three phase commutator circuit that may be connected to said switch means, and for during a period when said busses are not energized connecting each said driver transistor gate to said associated operational amplifier output to convert each of said six field effect driver transistors to a simulated FET diode during periods when said busses are de-energized.

\* \* \* \* \*